United States Patent
Yamada et al.

(10) Patent No.: US 8,142,867 B2
(45) Date of Patent: Mar. 27, 2012

(54) BIAXIALLY STRETCH BLOW-MOLDED CONTAINER AND PROCESS FOR PRODUCING THE SAME

(75) Inventors: Toshiki Yamada, Kanagawa (JP); Daisuke Kawamata, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 319 days.

(21) Appl. No.: 12/532,983

(22) PCT Filed: Mar. 28, 2008

(86) PCT No.: PCT/JP2008/056025
§ 371 (c)(1),
(2), (4) Date: Sep. 24, 2009

(87) PCT Pub. No.: WO2008/123401
PCT Pub. Date: Oct. 16, 2008

(65) Prior Publication Data
US 2010/0104785 A1 Apr. 29, 2010

(30) Foreign Application Priority Data
Mar. 28, 2007 (JP) .................................. 2007-085501

(51) Int. Cl.
*B29D 22/00* (2006.01)
(52) U.S. Cl. .................. 428/35.7; 428/36.92; 428/36.9
(58) Field of Classification Search ............... 428/35.7, 428/36.92, 36.9
See application file for complete search history.

(56) References Cited

U.S. PATENT DOCUMENTS

| | | | | |
|---|---|---|---|---|
| 6,680,094 B2 * | 1/2004 | Kikuchi et al. | | 428/36.6 |
| 6,878,774 B2 * | 4/2005 | Kikuchi et al. | | 525/66 |
| 7,238,419 B2 * | 7/2007 | Kern et al. | | 428/328 |
| 7,358,324 B2 * | 4/2008 | Chen et al. | | 528/288 |
| 2007/0087145 A1 * | 4/2007 | Hanita et al. | | 428/35.7 |
| 2009/0294457 A1 * | 12/2009 | Shi et al. | | 220/669 |
| 2010/0014785 A1 * | 1/2010 | Deck | | 383/12 |
| 2010/0129577 A1 * | 5/2010 | Sasai et al. | | 428/36.7 |

FOREIGN PATENT DOCUMENTS

| | | |
|---|---|---|
| EP | 1650260 | 4/2006 |
| JP | 10-101051 | 4/1998 |
| JP | 2000-296593 | 10/2000 |
| JP | 2001-038866 | 2/2001 |
| JP | 2002-249651 | 9/2002 |

* cited by examiner

*Primary Examiner* — N. Edwards
(74) *Attorney, Agent, or Firm* — Greenblum & Bernstein, P.L.C.

(57) ABSTRACT

A biaxially stretch blow-molded container having a layer of a trimethylene naphthalate type polyester resin, wherein the layer of the trimethylene naphthalate type polyester resin in at least the container body portion satisfies either one or both of:
(i) a Tc1 calorific value is not larger than 10 J/g in the DSC measurement; and
(ii) tan δ maximum temperature $\geqq$ 90° C. and tan δ maximum value $\leqq$ 0.4
  in the dynamic viscoelasticity measurement, the biaxially stretch blow-molded container effectively exhibiting excellent gas-barrier property possessed by the trimethylene naphthalate type polyester resin.

6 Claims, 2 Drawing Sheets

BIAXIALLY STRETCH BLOW-MOLDED CONTAINER AND PROCESS FOR PRODUCING THE SAME

TECHNICAL FIELD

This invention relates to a biaxially stretch blow-molded container having a layer of a trimethylene naphthalate type polyester resin and to a process for producing the same. More specifically, the invention relates to a biaxially stretch blow-molded container having excellent gas-barrier property and can be excellently recycled, and a process for producing the same.

BACKGROUND ART

Functional resins have heretofore been used for imparting functions such as gas-barrier properties and the like properties to the biaxially stretch blow-molded containers. For example, there have been proposed a variety of multi-layer containers including inner and outer layers of a polyester resin such as polyethylene terephthalate and an intermediate layer of a resin composition comprising a gas-barrier resin such as ethylene/vinyl alcohol copolymer or a polyamide resin, an oxidizing organic component and a transition metal catalyst.

Referring to the container comprising a polyester resin, on the other hand, it is a modern trend to recycle the containers. From this point of view, therefore, it is desired that the container as a whole comprises the polyester resin and, therefore, not to use resins or resin compositions other than the polyester resin. It is, therefore, desired that in the multi-layer containers, too, the functional resin or the resin composition that forms the intermediate layer is the polyester resin.

A polytrimethylene naphthalate has also been known as a functional polyester resin having excellent heat resistance, gas barrier property and, particularly, carbon dioxide gas-barrier property. There have been, further, proposed a polyester multi-layer sheet having a polyethylene terephthalate resin layer and a polytrimethylene naphthalate resin layer (patent documents 1, 2) and a single-layer bottle comprising a blend of an ethylene terephthalate type polyester resin, a polybutylene naphthalate and a polytrimethylene naphthalate (patent document 3).

That is, the polytrimethylene naphthalate type polyester resin is a polyester resin having thermal properties close to those of the polyethylene terephthalate and, further, has excellent gas-barrier property offering superior heat moldability to that of other kinds of gas-barrier resins that have heretofore been used being laminated on the polyethylene terephthalate. Besides, the polytrimethylene naphthalate type polyester resin is the polyester resin which is the same as the polyethylene terephthalate. Therefore, the multi-layer container thereof also using the polyethylene terephthalate is suited to being excellently recycled.

Patent document 1: JP-A-2000-296593
Patent document 2: JP-A-2001-038866
Patent document 3: European Patent Application Laid-Open No. 1650260

DISCLOSURE OF THE INVENTION

Problems that the Invention is to Solve

It was learned, however, that depending upon the molding method, the container having a layer of the polytrimethylene naphthalate could not often exhibit excellent gas-barrier property of the polytrimethylene naphthalate.

The material evaluation references for evaluating the recycled resins include (i) that the constituent materials are free of problems from the standpoint of hygiene standard and safety (hygiene property), (ii) that the materials are not discolored, degenerated or deteriorated by the washing with an alkali (adaptability to the reproduction treatment), and (iii) that the materials satisfy the references for evaluating the adaptability of reuse. The multi-layer containers comprising the polytrimethylene naphthalate and the polyethylene terephthalate are capable of satisfying the above (i) and (ii) but are not still satisfactory with respect to the above point (iii). That is, polytrimethylene naphthalate and polyethylene terephthalate are incompatible with each other. Therefore, even if they are subjected to the reproduction treatment by simply conducting milling and melting, the blend thereof becomes cloudy from which clear articles cannot be reproduced.

In order to solve the above problem, it can be attempted to increase the thermal load of the blend at the time of reproduction treatment in order to promote the ester-exchange reaction of polytrimethylene naphthalate and polyethylene terephthalate resulting, however, in a decrease in the molecular weight and deterioration of color tone. It can be further contrived to add an ester-exchange reaction catalyst which, however, is not desirable from the standpoint of material cost.

It is, therefore, an object of the present invention to provide a biaxially stretch blow-molded container by using a trimethylene naphthalate type polyester resin, the biaxially stretch blow-molded container effectively exhibiting excellent gas-barrier property of the trimethylene naphthalate type polyester resin, and a process for producing the same.

Another object of the present invention is to provide a process for producing a recycled polyester resins having excellent transparency from the multi-layer containers having a layer of the trimethylene naphthalate type polyester resin and the ethylene terephthalate type polyester resin.

Means for Solving the Problems

According to the present invention, there is provided a biaxially stretch blow-molded container having a layer of a trimethylene naphthalate type polyester resin, wherein the layer of the trimethylene naphthalate type polyester resin in at least the container body portion satisfies either one or both of:
  (i) a Tc1 calorific value is not larger than 10 J/g in the DSC measurement; and
  (ii) tan δ maximum temperature$\geq 90°$ C. and tan δ maximum value$\leq 0.4$
  in the dynamic viscoelasticity measurement.

Here, the Tc1 calorific value by the DSC stands for a calorific value at an exothermic peak that accompanies the crystallization as measured by using a differential scanning calorimeter (DSC).

In the biaxially stretch blow-molded container of the invention, it is desired that:
1. The trimethylene naphthalate type polyester resin is homopolytrimethylene naphthalate;
2. The biaxially stretch blow-molded container has a multi-layer structure comprising an intermediate layer of the trimethylene naphthalate type polyester resin, and an inner layer and an outer layer of an ethylene terephthalate type polyester resin (hereinafter often referred to as PET);
3. The ethylene terephthalate type polyester resin in the multi-layer structure has a difference in the intrinsic viscosity of not smaller than 0.25 dL/g upon heat-treating the ethylene terephthalate type polyester resin layer;

4. The trimethylene naphthalate type polyester resin layer in the multi-layer structure has a thickness ratio of 0.1 to 15% relative to the thickness of the whole layers of the container body portion; and 5. The shape of the bottom portion is a pressure-resistant shape.

According to the present invention, there is further provided a process for producing a biaxially stretch blow-molded container by subjecting a preform having a layer of a trimethylene naphthalate type polyester resin to any one of the steps of (i) biaxially stretch blow-molding the preform at a stretching temperature of 110 to 130° C., (ii) biaxially stretch blow-molding the preform in a metal mold heated at 90 to 150° C. followed by heat-setting, or (iii) biaxially stretch blow-molding the preform at a stretching temperature of 110 to 130° C. in a metal mold heated at 90 to 150° C. followed by heat-setting.

In the process for producing a biaxially stretch blow-molded container of the present invention, it is desired that the preform has an intermediate layer of the trimethylene naphthalate type polyester resin, and an inner layer and an outer layer of the ethylene terephthalate type polyester resin.

According to the present invention, there is further provided a process for producing a recycled polyester resin by melt-extruding flakes obtained by milling the biaxially stretch blow-molded multi-layer containers so as to reproduce an injection-molded plate of a thickness of 3 mm having a haze of not higher than 5%.

EFFECTS OF THE INVENTION

The biaxially stretch blow-molded container having a layer of the trimethylene naphthalate type polyester resin of the invention effectively exhibits excellent gas-barrier property inherent in the trimethylene naphthalate type polyester resin. Therefore, the gas-barrier property can be efficiently exhibited even by forming a layer of the trimethylene naphthalate type polyester resin having a small thickness.

Further, the trimethylene naphthalate type polyester resin has particularly excellent carbon dioxide gas-barrier property. Therefore, a container having a particularly excellent pressure resistance can be obtained by forming the bottom portion thereof in a pressure-resistant shape as represented by a so-called petaloide shape.

In the biaxially stretch blow-molded container of the invention, excellent gas-barrier properties possessed by the biaxially stretch blow-molded container of the invention are quantitatively specified by using two parameters, i.e., by a maximum value of tan δ and a maximum temperature of tan δ in the measurement of dynamic viscoelasticity (DMA) or by the calorific value by the differential scanning calorimeter (DSC). Therefore, the gas-barrier property can be easily evaluated even when it is difficult to pick up homogeneous samples.

Further, the multi-layer container having layers of the trimethylene naphthalate type polyester resin and the ethylene terephthalate type polyester resin of the invention, features excellent inter-layer adhesion and are, further, suited to being recycled.

According to the process for producing a biaxially stretch blow-molded container of the invention, further, it is made possible to produce the biaxially stretch blow-molded container having the above-mentioned features.

According to the process for producing the recycled polyester resin of the invention, further, the ester-exchange reaction of the ethylene terephthalate type polyester resin and the trimethylene naphthalate type polyester resin can be promoted by effectively utilizing a catalyst that is not still losing activity in the ethylene terephthalate type polyester resin. Accordingly, a recycled polyester resin having excellent transparency can be produced.

The recycled resin reproduced by the method of the present invention has excellent transparency; i.e., a 3 mm-thick plate injection-molded at a temperature of 300° C. has a haze of not higher than 5% yet containing the trimethylene naphthalate type polyester resin and, therefore, exhibiting excellent gas-barrier property.

BEST MODE FOR CARRYING OUT THE INVENTION

Figure 1:
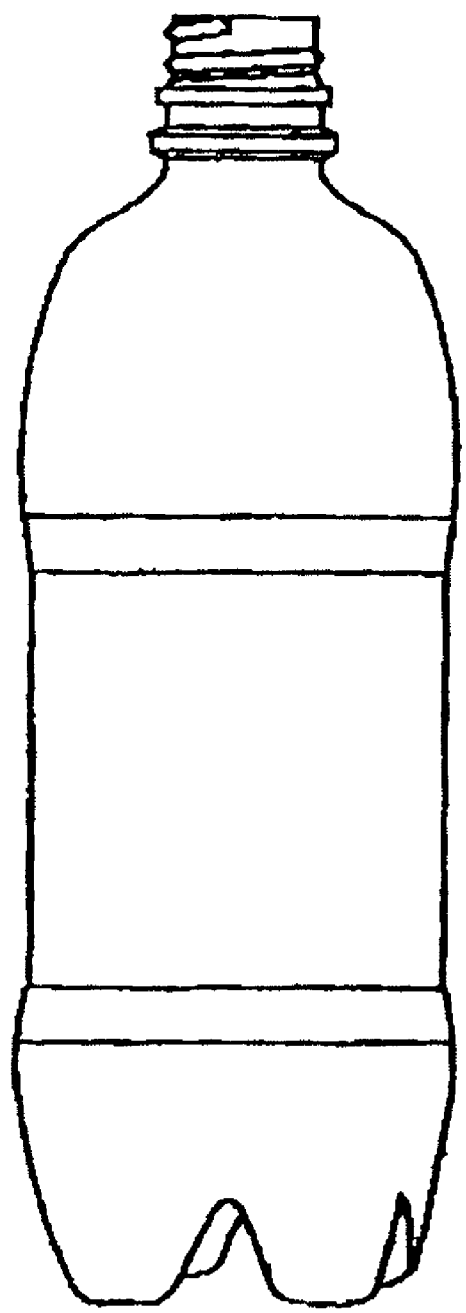
[FIG. 1] is a side view of a biaxially stretch blow-molded container prepared in Examples.

In the biaxially stretch blow-molded container having a layer of the trimethylene naphthalate type polyester resin of the invention, an important feature resides in that the layer of the trimethylene naphthalate type polyester resin in at least the container body portion satisfies that a Tc1 calorific value is not larger than 10 J/g in the DSC measurement and/or that tan δ maximum temperature is not lower than 90° C. and tan δ maximum value is not larger than 0.4 in the dynamic viscoelasticity measurement.

The present inventors have discovered the fact that the gas-barrier property of the container having the layer of the trimethylene naphthalate type polyester resin varies depending upon the crystallinity of the trimethylene naphthalate type polyester resin in the container, and that the Tc1 calorific value in the DSC measurement and the value of tan δ in the dynamic viscoelasticity measurement have correlations with the gas-barrier property of the trimethylene naphthalate type polyester resin.

Namely, the Tc1 calorific value in the DSC measurement and the value of tan δ in the dynamic viscoelasticity measurement are parameters including data of the crystallinity of the resin though different methods are required for measuring them. The present invention is based on a discovery that excellent gas-barrier property can be exhibited by a container having a layer of the trimethylene naphthalate type polyester resin which satisfies either one or both of that a Tc1 calorific value is not larger than 10 J/g in the DSC measurement or that tan δ maximum temperature is not lower than 90° C. and tan δ maximum value is not larger than 0.4 in the dynamic viscoelasticity measurement of the container body portion.

Further, the DSC measurement and the dynamic viscoelasticity measurement are taken in at least the container body portion. This is because the body portion is most stretched among other portions of the container, and the effect due to the stretching can be explicitly measured.

Here, the value of tan δ in the dynamic viscoelasticity (DMA) measurement is a value obtained by dividing a loss modulus of elasticity E" by a storage modulus of elasticity E', the value representing a ratio of the non-crystal portion contributing to a loss component and a crystal portion contributing to a storage component. Therefore, the smaller the absolute value thereof, the higher the crystallinity. Further, the higher the tan δ maximum temperature, the higher the ratio of tension and constraint in the non-crystal portion. Namely, polymer chains are much tensioned and constrained in the non-crystal portion being induced by crystallization, whereby the glass transition temperature apparently rises, and the so-called free volume that serves as transmission passages for gas decreases. Therefore, the biaxially stretch blow-molded container of the invention exhibits excellent gas-barrier property.

The biaxially stretch blow-molded container having a layer of the trimethylene naphthalate type polyester resin of the invention can be produced by a production process by subjecting a preform having the layer of the trimethylene naphthalate type polyester resin to any one of the steps of (i) biaxially stretch blow-molding the preform at a stretching temperature of 110 to 130° C., (ii) biaxially stretch blow-molding the preform in a metal mold heated at 90 to 150° C. followed by heat-setting, or (iii) biaxially stretch blow-molding the preform at a stretching temperature of 110 to 130° C. in a metal mold heated at 90 to 150° C. followed by heat-setting.

The present inventors have discovered that the trimethylene naphthalate type polyester resin exhibits gas-barrier property that greatly varies over a temperature range in which stretching can be attained and that an article obtained by stretching the trimethylene naphthalate type polyester resin at a low temperature exhibits poor gas-barrier property. That is, in forming the biaxially stretch blow-molded container having the layer of the trimethylene naphthalate type polyester resin, if the molding is conducted under the stretching conditions and heat-setting conditions that are employed for molding the biaxially stretch blow-molded containers comprising the ordinary polyester resins, then neither the Tc1 calorific value in the DSC measurement nor the tan δ value in the dynamic viscoelasticity measurement lie within the above-mentioned ranges. As a result, the obtained container fails to fully exhibit excellent gas-barrier property possessed by the trimethylene naphthalate type polyester resin.

This will become obvious from the results of Examples described later. When the stretching temperature lies in the above range (Example 1), when the biaxial stretch blow-molding is conducted by using a metal mold in the above temperature range followed by heat-setting (Example 4), and when the stretching temperature lies in the above range and the biaxial stretch blow-molding is conducted by using the metal mold in the above temperature range followed by heat-setting (Examples 2, 3, 5 and 6), the Tc1 calorific values in the DSC measurement and/or the tan δ values in the dynamic viscoelasticity measurement are all within the ranges of the present invention, and excellent carbon dioxide gas-barrier property and oxygen-barrier property are obtained. When the stretching temperature does not lie in the above range and the biaxial stretch blow-molding is conducted at a temperature outside the above temperature range, followed by heat-setting (Comparative Examples 1 and 3), however, neither the Tc1 calorific values in the DSC measurement nor the tan δ values in the dynamic viscoelasticity measurement lie in the ranges of the invention, and excellent gas-barrier properties inherent in the trimethylene naphthalate type polyester resin are not exhibited to a sufficient degree.

In the multi-layer biaxially stretch blow-molded container having an intermediate layer of the trimethylene naphthalate type polyester resin and inner and outer layers of the ethylene terephthalate type polyester resin, when the ethylene terephthalate type polyester resin has a difference in the intrinsic viscosity of not smaller than 0.25 dL/g upon being heat-treated, flakes obtained by milling the biaxially stretch blow-molded containers can be melt-extruded to reproduce a 3 mm-thick injection-molded plate having a haze of not higher than 5%.

As described above, the trimethylene naphthalate type polyester resin and the ethylene terephthalate type polyester resin are not, usually, compatible with each other. Therefore, even if the multi-layer containers having a layer of the trimethylene naphthalate type polyester resin and layers of the ethylene terephthalate type polyester resin are simply milled and melted, the mixture thereof undergoes phase separation and becomes cloudy.

In the process for producing a recycled polyester resin of the invention, an important feature resides in that the ethylene terephthalate type polyester resin having a difference in the intrinsic viscosity of not smaller than 0.25 dL/g before and after the heat treatment is used for the multi-layer container that has the layer of the trimethylene naphthalate type polyester resin and the layers of the ethylene terephthalate type polyester resin. This makes it possible to produce the recycled polyester resin free of the above-mentioned problems.

That is, the ethylene terephthalate type polyester resin which develops a difference in the intrinsic viscosity of not smaller than 0.25 dL/g upon the heat treatment means that the polycondensation catalyst in the ethylene terephthalate type polyester resin is not still losing activity. As a result, the polycondensation catalyst in the ethylene terephthalate type polyester resin works as an ester-exchange reaction catalyst for rendering the trimethylene naphthalate type polyester resin and the ethylene terephthalate type polyester resin to be compatible with each other in the reproduction treatment. Therefore, the blend of the trimethylene naphthalate type polyester resin and the ethylene terephthalate type polyester resin does not undergo phase separation and can be obtained in a transparent form.

The heat-treating conditions for measuring the difference in the intrinsic viscosity are as described below. Namely, the heat treatment is conducted for 4 hours in vacuum at 150° C. and for another 5 hours in vacuum at 210° C. to measure a difference in the intrinsic viscosity of the ethylene terephthalate type polyester resin before and after the heat treatment.

The above action and effect of the process for producing a recycled polyester resin of the invention will become obvious from the results of Examples described later.

That is, when a recycled polyester resin is produced by using the biaxially stretch blow-molded multi-layer containers of the invention produced by using the ethylene terephthalate type polyester resin having a difference in the intrinsic viscosity of not smaller than 0.25 dL/g before and after the heat treatment, the recycled polyester resin exhibits a haze of not higher than 5% featuring excellent transparency (Examples 7 and 8). When the recycled polyester resin is produced by using the biaxially stretch blow-molded multi-layer containers of the invention produced by using the ethylene terephthalate type polyester resin having a difference in the intrinsic viscosity of smaller than 0.25 dL/g before and after the heat treatment, however, the recycled polyester resin has a haze in excess of 5% and fails to satisfy the references of evaluation of the adaptability of reuse from with respect to the transparency.

(Trimethylene Naphthalate Type Polyester Resin)

It is desired that the trimethylene naphthalate type polyester resin used in the present invention contains 2,6-naphthalenedicarboxylic acid as dicarboxylic acid component in an amount of not less than 50 mol % and, particularly, not less than 80 mol % and contains 1,3-propanediol as diol component in an amount of not less than 50 mol % and, particularly, not less than 80 mol %. Particularly desirably, the trimethylene naphthalate type polyester resin is homopolytrimethylene naphthalate from the standpoint of gas-barrier property.

As dicarboxylic acid other than 2,6-naphthalenedicarboxylic acid, there can be exemplified 2,7-naphthalenedicarboxylic acid, 1,5-naphthalenedicarboxylic acid, 1,4-naphthalenedicarboxylic acid, terephthalic acid, isophthalic acid, succinic acid, adipic acid, sebacic and phthalic acid.

As the diol component other than 1,3-propanediol, there can be exemplified ethylene glycol, 1,2-propanediol, 1,4-butanediol, tetramethylene glycol, hexamethylene glycol, neopentyl glycol, octamethylene glycol, 1,6-hexylene glycol, diethylene glycol, triethylene glycol, cyclohexane dimethanol, ethylene oxide adduct of bisphenol A, glycerol and trimethylolpropane.

Further, the trimethylene naphthalate type polyester resin used in the invention is the one produced by a conventional polymerization method.

Further, the trimethylene naphthalate type polyester resin may be blended with other polyester resins such as polyethylene terephthalate, polybutylene terephthalate or polyethylene isophthalate in an amount of not more than 50% by weight.

It is desired that the trimethylene naphthalate type polyester resin has an intrinsic viscosity in a range of 0.3 to 1.0 dL/g as measured at 30° C. by using a phenol/tetrachloroethane mixed solvent at a weight ratio of 1:1.

(Ethylene Terephthalate Type Polyester Resin)

As the ethylene terephthalate type polyester resin forming the inner and outer layers of the multi-layer container of the present invention, there can be used the one in which not less than 80 mol % and, particularly, not less than 95 mol % of the dicarboxylic acid component is terephthalic acid, and not less than 80% and, particularly, not less than 95 mol % of the diol component is ethylene glycol. In particular, it is desired that the ethylene terephthalate type polyester resin is homopolyethylene terephthalate from the standpoint of mechanical properties and thermal properties.

As the carboxylic acid component other than terephthalic acid, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodium sulfoisophthalic acid, hexahydroterephthalic acid, adipic acid and sebacic acid.

As the diol component other than ethylene glycol, there can be exemplified 1, 4-butanediol, propylene glycol, neopentyl glycol, 1,6-hexylene glycol, diethylene glycol, triethylene glycol, cyclohexane dimethanol, ethylene oxide adduct of bisphenol A, glycerol and trimethylolpropane.

Further, the above dicarboxylic acid component and diol component may include trifunctional or more highly functional polybasic acids and polyhydric alcohols, e.g., polybasic acids such as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, and biphenyl-3,4,3',4'-tetracarboxylic acid; and polyhydric alcohols such as pentaerythritol, glycerol, trimethylolpropane, 1,2,6-hexanetriol, sorbitol, and 1,1,4,4-tetrakis(hydroxymethyl)cyclohexane.

It is desired that the polyester resin used for the multi-layer container of the present invention has an intrinsic viscosity in a range of 0.4 to 1.5 dL/g as measured at 30° C. by using a phenol/tetrachloroethane mixed solvent at a weight ratio of 1:1.

Further, it is particularly desired that the ethylene terephthalate type polyester resin used for the multi-layer container of the invention has a difference in the intrinsic viscosity of not smaller than 0.25 dL/g and, particularly, in a range of 0.25 to 0.5 dL/g before and after the heat treatment for 4 hours in vacuum at 150° C. and for another 5 hours in vacuum at 210° C. as described above. As the ethylene terephthalate type polyester resin which is not losing the catalytic activity, it is desired to use the one other than those of the heat resisting grade, e.g., to use the one of the pressure resisting grade since the ethylene terephthalate type polyester resins of the heat resisting grade are, generally, losing catalytic activity.

The polyester resin forming the inner and outer layers of the present invention can be blended with blending agents for resins that are known per se., such as coloring agent, antioxidizing agent, stabilizer, various antistatic agents, parting agent, lubricant and nucleating agent according to known recipe in a range in which they do not impair the quality of the finally molded articles.

(Biaxially Stretch Blow-molded Container)

The biaxially stretch blow-molded container of the present invention may be a single-layer container of the trimethylene naphthalate type polyester resin or may be a multi-layer container having a layer of the trimethylene naphthalate type polyester resin as well as layers of other resin or, preferably, layers of the ethylene terephthalate type polyester resin so far as the container has the layer of the trimethylene naphthalate type polyester resin.

Figure 2:
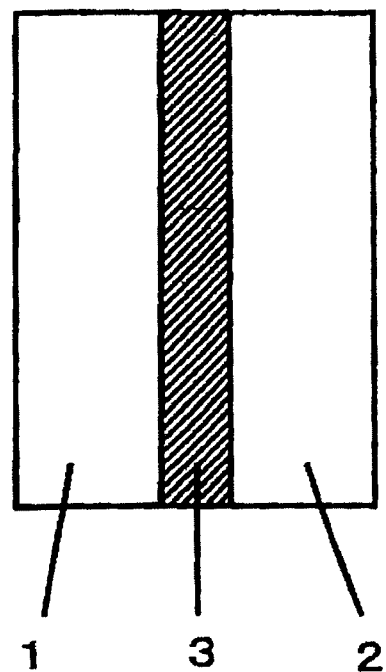
[FIG. 2] is a sectional view showing a multi-layer structure of the biaxially stretch blow-molded container of the invention.
Figure 3:
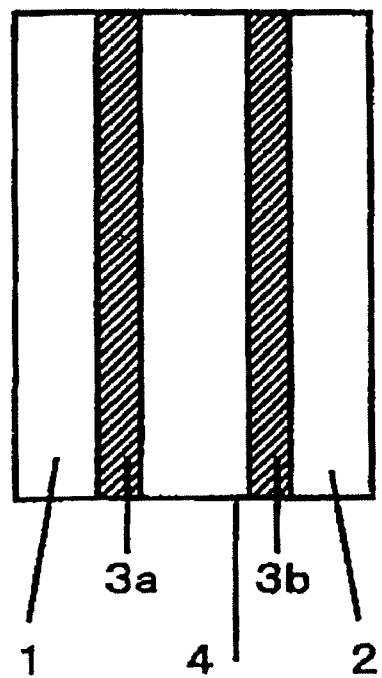
[FIG. 3] is a sectional view showing a multi-layer structure of the biaxially stretch blow-molded container of the invention.

The multi-layer container can employ a variety of layer constitutions so far as it has inner and outer layers of the ethylene terephthalate type polyester resin, and at least one intermediate layer of the trimethylene naphthalate type polyester resin. As shown in FIG. 2, the multi-layer container may have a layer constitution having an intermediate layer 3 of the trimethylene naphthalate type polyester resin between an inner layer 1 and an outer layer 2 of the ethylene terephthalate type polyester resin. Or, as shown in FIG. 3, the multi-layer container may have a layer constitution including an inner layer 1 and an outer layer 2 of the ethylene terephthalate type polyester resin, as well as two intermediate layers 3a and 3b of the trimethylene naphthalate type polyester resin between the inner layer 1 of the ethylene terephthalate type polyester resin and an intermediate layer 4 of the ethylene terephthalate type polyester resin and between the outer layer 2 of the ethylene terephthalate type polyester resin and the intermediate layer 4 of the ethylene terephthalate type polyester resin.

The container of the invention having the layer of the trimethylene naphthalate type polyester resin features excellent gas-barrier property and, particularly, carbon dioxide gas-barrier property, and can be favorably used as a pressure-resistant container for containing carbonated beverages. It is, therefore, desired that the biaxially stretch blow-molded container and, particularly, the bottle of the invention has a bottom portion of a so-called petaloide shape as shown in FIG. 1 or has a bottom portion of a known pressure-resisting shape such as a champaign shape with a recessed portion formed at the center thereof.

As described above, further, the ethylene terephthalate type polyester resin used for the pressure-resistant containers contains the polycondensation catalyst that is not still losing its activity unlike the ethylene terephthalate type polyester resin that is used for the heat-resistant containers. Therefore, the difference in the intrinsic viscosity before and after the heat treatment is lying in the above range. Accordingly, the pressure-resistant multi-layer container of the invention is suited for producing a recycled polyester resin of the invention.

In the biaxially stretch blow-molded container of the invention, it is desired that the thickness of the body portion lies in a range of 50 to 5000 μm in the case of the trimethylene naphthalate type polyester resin single-layer container though it may vary depending upon the volume (weight) of the container and the use of the container.

In the case of the multi-layer container, further, it is desired that the thickness of the trimethylene naphthalate type polyester resin layer is in a range of 0.1 to 15% of the whole thickness in the container body portion. If the thickness of the trimethylene naphthalate type polyester resin layer is smaller than the above range, the gas-barrier property is not attained to a sufficient degree. If the thickness of the trimethylene naphthalate type polyester resin layer is larger than the above range, on the other hand, disadvantage results in economy and in recycling the resins.

In producing the multi-layer container, though usually unnecessary, an adhesive resin may be interposed among the resin layers. As the adhesive resin, there can be exemplified thermoplastic resins containing carbonyl (—CO—) groups based on carboxylic acid, carboxylic anhydride, carboxylate, carboxylic acid amide or carboxylic acid ester in the main chain or in the side chain thereof at a concentration of 1 to 700 milliequivalents (meq)/100 g of the resin and, particularly, 10 to 500 meq/100 g of the resin. Preferred examples of the adhesive resin include ethylene/acrylic acid copolymer, ionically crosslinked olefin copolymer, maleic anhydride-grafted polyethylene, maleic anhydride-grafted polypropylene, acrylic acid-grafted polyolefin, ethylene/vinyl acetate copolymer, and copolymerized polyester.

(Process for Producing a Biaxially Stretch Blow-molded Container)

The biaxial stretch blow-molded container of the present invention can be formed by a conventional biaxial stretch blow-molding method by using a single-layer preform of the trimethylene naphthalate type polyester resin or by using the above-mentioned multi-layer preform. Here, in executing the biaxial stretch blow-molding, an important feature resides in employing any one of the steps of (i) biaxial stretch blow-molding at a stretching temperature of 110 to 130° C. and, particularly, 110 to 120° C., (ii) biaxial stretch blow-molding in a metal mold heated at 90 to 150° C. and, particularly, 90 to 120° C. followed by heat-setting, or (iii) biaxial stretch blow-molding at a stretching temperature of 110 to 130° C. and, particularly, 110 to 120° C. in a metal mold heated at 90 to 150° C. and, particularly, 90 to 120° C. followed by heat-setting. Here, the preform-heating temperature, i.e., stretching temperature is a temperature on the surface of the preform just before being stretch blow-molded, and can be measured by using a radiation thermometer, a heat image-measuring instrument, etc.

The multi-layer preform can be produced by a known molding method such as a co-extrusion molding method which co-extrudes the trimethylene naphthalate type polyester resin and the ethylene terephthalate type polyester resin; a simultaneous injection-molding method which simultaneously injects the trimethylene naphthalate type polyester resin and the ethylene terephthalate type polyester resin into a metal mold, a sequential injection method which sequentially injects the ethylene terephthalate type polyester resin, the trimethylene naphthalate type polyester resin and the ethylene terephthalate type polyester resin into the metal mold, or a compression-molding method which compression-molds a co-extruded product of the trimethylene naphthalate type polyester resin and the ethylene terephthalate type polyester resin by using a core mold and a cavity mold.

When any one of these systems is employed, the preform that is molded should be maintained in a super-cooled state, i.e., in an amorphous state. It is, further, desired that the intermediate layer of the trimethylene naphthalate type polyester resin is sealed in the inner layer and outer layer of the ethylene terephthalate type polyester resin.

It is desired that molding the multi-layer preform and the stretch blow-molding are conducted by the cold parison system. It is, however, also allowable to employ the hot parison system which executes the stretch blow-molding without completely cooling the multi-layer preform that is molded.

Prior to executing the stretch blow-molding, the preform is pre-heated up to a stretching temperature by such means as hot air, infrared-ray heater or h-f induction heating. In the present invention as described above, it is important to stretch-blow the preform by heating it at a temperature of 110 to 130° C. and, particularly, 110 to 120° C., which is higher than when the ethylene terephthalate type polyester resin is usually stretch blow-molded.

That is, if the temperature of the preform is lower than the above temperature, a low-temperature portion is made present in a direction of thickness of the preform, and the gas-barrier property of the trimethylene naphthalate type polyester resin cannot be exhibited over the whole layer to a sufficient degree. If the preform temperature is higher than the above range, on the other hand, the preform is softened and its center is deviated at the time of stretch blow-molding deteriorating the moldability, causing the thickness of the obtained multi-layer container to become non-uniform, causing the preform to be crystallized before being stretch blow-molded, and making it difficult to effect the molding.

In the invention, in preheating the preform for heating the preform at the above stretching temperature, the preform can also be effectively heated by inserting a heating body heated at a high temperature in the preform so as to heat the preform from the interior. It is desired that the temperature of the heating body used for the internal heating is in a range of 200 to 600° C. At the time of preheating the preform, in general, the heating is effected for 1 to 120 seconds.

The heated preform is fed into a known stretch blow-molding machine, is set in a metal mold, is tension-stretched in the axial direction by pushing in a stretching rod, and is stretched in the circumferential direction by blowing a fluid. Here, in the invention, it is important that the metal mold temperature is in a range of 90 to 150° C. and, particularly, 90 to 120° C., and the preform is heat-set upon coming in contact with the surface of the metal mold. That is, if the metal mold temperature is lower than the above temperature, the temperature of the blown atmosphere decreases, a low-temperature portion appears near the outer surface of the preform, and gas-barrier properties of the trimethylene naphthalate type polyester resin are not exhibited to a sufficient degree. On the other hand, if the temperature is higher than the above range, the preform is crystallized before being stretch blow-molded and cannot be molded. The time for conducting the heat-setting is desirably in a range of 0.5 to 5 seconds.

Further, in order to prevent the temperature of the blown atmosphere from lowering, it is desired to blow the hot air heated at 90 to 200° C.

It is desired that the stretching ratios of the biaxially stretch blow-molded container which is the final product are in such ranges as 1.5 to 25 times as the area ratio, 1.2 to 6 times in the axial direction, and 1.2 to 4.5 times in the circumferential direction.

The process for producing the biaxially stretch blow-molded container of the invention employs either (i) or (ii) above, or employs (iii) which includes both (i) and (ii), making it possible to produce the biaxially stretch blow-molded container having the above-mentioned properties.

(Process for Producing a Recycled Polyester Resin)

The process for producing a recycled polyester resin of the present invention can be carried out according to a conventional process but using the multi-layer biaxially stretch blow-molded container of the present invention having a layer of the trimethylene napthalate type polyester resin and layers of the ethylene terephthalate type polyester resin having a difference in the intrinsic viscosity of not smaller than 0.25 dL/g before and after the heat treatment, as described above.

That is, the multi-layer containers after washed are milled into flakes of a maximum diameter of about 5 to about 20 mm. The flakes are, thereafter, melt-kneaded in an extruder under the conditions of a temperature in a range of Tm+20 to Tm+50° C. with the melting point (Tm) of the ethylene terephthalate type polyester resin as a reference for a residence time of 0.5 to 10 minutes. The molten resin is, thereafter, extruded into any desired form such as pellets, fibers, sheets or films.

In the reproduction process of the present invention, the ethylene terephthalate type polyester resin contains the polycondensation catalyst that is not still losing its activity and that works to promote the ester-exchange reaction between the trimethylene naphthalate type polyester resin and the ethylene terephthalate type polyester resin. Therefore, though the catalyst does not have to be particularly added, it is allowable to use an ester-exchange reaction catalyst in small amounts in order to efficiently execute the reproduction, as a matter of course.

At the time of melt-kneading, further, the above-mentioned blending agents for resins may be blended as required according to a known recipe.

EXAMPLES

Measurements

1. Measuring the Tc1 Calorific Value.

A polytrimethylene naphthalate resin layer was cut out from a bottle body portion and was measured by using a differential scanning calorimeter (EXSTAR6000 DSC: manufactured by Seiko Instruments Co.) for its calorific value at a crystallization peak (Tc1) that was observed near 100° C. when the temperature was elevated from 20° C. through up to 290° C. at a rate of 10° C./min.

2. Tan δ in the Dynamic Viscoelasticity Measurement.

The polytrimethylene naphthalate resin layer was cut out from the bottle body portion. A test piece measuring 10 mm wide and 30 mm long was so cut out that the lengthwise direction was the direction of height of the bottle, and was measured by using a viscoelasticity spectrometer (EX-STAR6000 DMS: manufactured by Seiko Instruments Co.) under the following conditions. A minimum tension and a gauge length were suitably adjusted depending upon the size and thickness of the sample. Tan δ maximum values and tan δ maximum temperatures were derived from the obtained tan δ curve.

Measuring Mode: Tensile Sinusoidal Mode
Gauge length of test piece: 5 to 20 mm
Frequency: 1 Hz
Minimum tension: 50 to 100 mN
Temperature elevation profile: Elevated from 25° C. through up to 210° C. at a rate of 212/min.

3. Measuring the Carbon Dioxide Gas-Barrier Property.

The dry ice of a required amount was introduced into the bottle so that the initial internal pressure was 0.4 MPa, and the bottle was sealed with an aluminum cap with septum. The bottle was stored under the conditions of 25° C. 50% RH, and the internal pressure in the bottle was measured every two weeks until 12 weeks have passed. From the internal pressures plotted over 12 weeks every two weeks, a gradient of a straight line of a pressure drop was found by the method of least squares and was used as an index of carbon dioxide gas-barrier property.

4. Measuring the Intrinsic Viscosities of the Ethylene Terephthalate Type Resin Before and after the Heat Treatment.

*Preparation of a Sample Before the Heat Treatment.

The polyethylene terephthalate resin was cut out from the mouth portion of the bottle and was measured for its intrinsic viscosity.

*Preparation of a Sample after the Heat Treatment.

The polyethylene terephthalate resin was cut out from the mouth portion of the bottle and was pulverized by using a freeze pulverizer (JFC-300 manufactured by Nihon Bunseki Kogyo Co.). Thereafter, the coarse particles thereof were removed by using a mesh (perforation size of 710 μm), and the powder was thinly laid in a laboratory dish made from an aluminum foil. The laboratory dish was introduced into a program vacuum oven (VOS-450VD manufactured by Tokyo Rika Kikai Co.) and, after maintained in vacuum (1 Toll or lower) at 150° C. for 4 hours, was heat-treated in vacuum at 210° C. for 5 hours.

*Measuring the Intrinsic Viscosity.

By using the Ubbelohde's capillary viscometer, the samples before and after the heat treatment were measured for their intrinsic viscosities. The measuring conditions were as follows:

Solvent composition: Phenol:1,1,2,2-tetrachloroethane=1:1 (weight ratio)
Measuring temperature: 30° C.
Huggins' constant: 0.33

5. Haze.

The molded bottle was pulverized into flakes by using a plastic pulverizer (Horai Co.). The mesh size was 8 mm in diameter. By using a vent-type twin screw extruder [TEM35B manufactured by Toshiba Kikai Co.], the flakes were melt-extruded (preset temperature of 290° C.) into strands from which amorphous recycled polyester resin pellets were obtained by using a granulating facility which included a cooling water tank, a cooling conveyer and a cutter. Next, by using a stirring-type vacuum drier [Model 45MV manufactured by Dalton Co.], the pellets were heated and dried at 150° C. in vacuum for 4 hours and was crystallized in vacuum at 210° C. for 5 hours. The pellets were, thereafter, fed into a hopper of an injection-molding machine equipped with a sheet metal mold (NN75JS manufactured by Niigata Tekkosho Co.) and were molded into a sheet of a thickness of 3 mm under the conditions of a preset temperature of 300° C. and a cycle time of 45 seconds. To conduct the injection-molding, the molding was effected a sufficient number of times until the residence time was stabilized. Thereafter, the samples were picked up and measured for their hazes. The injection-molded plate of the thickness of 3 mm was measured for its haze by using a color computer [SM-4 manufactured by Suga Shikenki Co.]. The measured value was obtained from an average value at three points.

Molding and Measuring the Single-layer Bottles

Example 1

A homopolytrimethylene naphthalate resin (intrinsic viscosity: 0.72 dL/g) after dried was fed into a hopper of an injection-molding machine (NN75JS manufactured by Niigata Tekkosho Co.) and was injection-molded at a barrel preset temperature of 280° C. and a cycle time of 30 seconds to form a single-layer preform for a bottle of a weight of 32 g and a mouth diameter of 28 mm.

Next, the preform was heated at a stretching temperature of 118° C. from the outer side by using an infrared-ray heater and from the inner side by using a heated iron core, biaxially stretch blow-molded under the conditions of stretching ratios in the body portion of about 3 times longitudinally, about 3 times transversely and about 9 times in area. The temperature of the blowing metal mold and the temperature of the blow air were both set at room temperature (25° C.), and the cooling air of room temperature (25° C.) was introduced into the container at the time of discharging the blown air before the parting in order to obtain a single-layer stretch blow-molded bottle of a shape as shown in FIG. 1 having a thickness of 0.35 to 0.4 mm near the center of the body portion and a full-filled content of 522 ml.

The bottle was measured for its Tc1 of the body portion, dynamic viscoelasticity and carbon dioxide gas-barrier property of the bottle.

Example 2

A bottle was stretch blow-molded in the same manner as in Example 1 but setting the metal mold temperature at 90° C. and conducting the heat-setting for about 2.5 seconds, and was measured.

Example 3

A bottle was stretch blow-molded in the same manner as in Example 1 but setting the metal mold temperature at 120° C. and conducting the heat-setting for about 2.5 seconds, and was measured.

Comparative Example 1

A bottle was stretch blow-molded in the same manner as in Example 1 but setting the temperature for stretching the preform at 100° C., and was measured.

Comparative Example 2

A bottle was stretch blow-molded in the same manner as in Example 1 but molding a single-layer preform of a polyethylene terephthalate resin (intrinsic viscosity: 0.83 dL/g) (BK6180B manufactured by Nihon Unipet Co.) and setting the temperature for stretching the preform at 100° C. at the time of stretch blow-molding, and was measured.

Molding and Measuring the Multi-layer Bottles

Example 4

In a co-injection-molding machine, a polyethylene terephthalate resin (intrinsic viscosity: 0.83 dL/g)(BK6180B manufactured by Nihon Unipet Co.) after dried was fed into the hoppers of an injection machine [A] for forming inner and outer layers and of an injection machine [B] for forming an intermediate layer. Further, a homopolytrimethylene naphthalate resin (intrinsic viscosity: 0.72 dL/g) after dried was fed into a hopper of an injection-molding machine [C] for forming a barrier layer. In these injection machines, a barrel preset temperature was set to be 280° C., a hot runner preset temperature was set to be 290° C. and a cycling time was set to be 30 seconds. The resins were sequentially injected into the injection metal molds in order of injection machines [A]→[C]→[B] to mold a multi-layer preform for a two-kind-five-layer bottle having an inner layer, an intermediate layer and an outer layer of the polyethylene terephthalate resin, and polytrimethylene naphthalate resin layers between the inner layer and the intermediate layer, and between the intermediate layer and the outer layer.

Next, the preform was heated at a stretching temperature of 104° C. from the outer side by using an infrared-ray heater and from the inner side by using a heated iron core, biaxially stretch blow-molded under the conditions of stretching ratios in the body portion of about 3 times longitudinally, about 3 times transversely and about 9 times in area. The temperature of the blowing metal mold was set at 150° C., the temperature of the blow air was set at room temperature (25° C.), and the heat-setting was conducted for about 2.5 seconds to obtain a stretch blow-molded multi-layer bottle of a shape as shown in FIG. 1 having a total thickness of 0.35 to 0.4 mm near the center of the body portion, having the homopolytrimethylene naphthalate resin layers (whole layers) at a thickness ratio of 5% of the thickness of the whole layers of the body portion and having a full-filled content of 522 ml.

The bottle was measured for its Tc1 of the body portion, dynamic viscoelasticity and carbon dioxide gas-barrier property of the bottle.

Example 5

A bottle was stretch blow-molded in the same manner as in Example 4 but setting the temperature for stretching the preform at 120° C., and was measured.

Example 6

A bottle was stretch blow-molded in the same manner as in Example 4 but setting the metal mold temperature at 120° C. and setting the temperature of the blow air at 110 to 130° C., and was measured.

Comparative Example 3

A bottle was stretch blow-molded in the same manner as in Example 4 but setting the temperature for stretching the preform at 104° C. and setting the temperature of the blowing metal mold at room temperature (25° C.), and was measured.

The measured results of the above Examples and Comparative Examples were as shown in Table 1.

TABLE 1

| | Bottle layer constitution | Stretching temp. (° C.) | Metal mold heat-set temp. (° C.) | Blow air temp. (° C.) | Tc1 calorific value of body portion (J/g) |
|---|---|---|---|---|---|
| Ex. 1 | single PTN layer | 118 | 25 | 25 | 6.0 |
| Ex. 2 | single PTN layer | 118 | 90 | 25 | 6.4 |
| Ex. 3 | single PTN layer | 118 | 120 | 25 | 2.0 |
| Comp. Ex. 1 | single PTN layer | 100 | 25 | 25 | 16.8 |
| Ex. 4 | 2-kind-5-layer (PTN 5 wt %) | 104 | 150 | 25 | 0 |
| Ex. 5 | 2-kind-5-layer (PTN 5 wt %) | 120 | 150 | 25 | 0 |
| Ex. 6 | 2-kind-5-layer (PTN 5 wt %) | 120 | 120 | 110-130 | 0 |
| Comp. Ex. 3 | 2-kind-5-layer (PTN 5 wt %) | 104 | 25 | 25 | 12.1 |

TABLE 1-continued

| Comp. Ex. 2 | single PET layer | 100 | 25 | 25 | — |

| | Viscoelasticity of body portion | | Carbon dioxide gas-barrier property | |
| --- | --- | --- | --- | --- |
| | Tan δ max. temp. (° C.) | Tan δ max. value | Barrier index | Degree of increase (*1) |
| Ex. 1 | 92.0 | 0.3666 | −0.002133 | 2.68 |
| Ex. 2 | 94.8 | 0.3404 | −0.001982 | 2.89 |
| Ex. 3 | 103.3 | 0.2790 | −0.001983 | 2.88 |
| Comp. Ex. 1 | 79.4 | 0.4579 | −0.004044 | 1.41 |
| Ex. 4 | 112.7 | 0.2345 | −0.004399 | 1.30 |
| Ex. 5 | 114.7 | 0.1906 | −0.004226 | 1.35 |
| Ex. 6 | 116.0 | 0.1810 | −0.004430 | 1.29 |
| Comp. Ex. 3 | 100.7 | 0.4133 | −0.004764 | 1.20 |
| Comp. Ex. 2 | — | — | −0.005719 | 1.00 |

(*1): Degree of increase based on the single PET layer bottle (Comparative Example 2).

[Molding a Multi-layer Bottle, Preparing a Recycled Polyester Resin Using the Multi-layer Bottle as a Starting Material, and Measurement]

Example 7

A multi-layer stretch blow-molded bottle was obtained in the same manner as in Example 4 but using the dried polyethylene terephthalate resin (intrinsic viscosity: 0.83 dL/g) (5015W manufactured by Shinko Gosen Co.) only in the co-injection-molding machine and setting the stretching temperature at 118° C.

The polyethylene terephthalate resin was cut out from the mouth portion of the bottle, and the ethylene terephthalate type resin was measured for its intrinsic viscosity before and after the heat treatment.

By using the multi-layer bottle as a starting material, further, there were prepared pellets of the recycled polyester resin and an injection-molded plate of a thickness of 3 mm. To conduct the injection-molding, the molding was effected a sufficient number of times until the residence time was stabilized. Thereafter, the samples were picked up and measured for their hazes.

Example 8

A multi-layer bottle was stretch blow-molded in the same manner as in Example 7 but using a polyethylene terephthalate resin (intrinsic viscosity: 0.83 dL/g) (BK6180B manufactured by Nihon Unipet Co.) as the polyethylene terephthalate resin of the inner layer, intermediate layer and outer layer, and was measured.

Comparative Example 4

A multi-layer bottle was stretch blow-molded in the same manner as in Example 7 but using a polyethylene terephthalate resin (intrinsic viscosity: 0.75 dL/g) (TR8550F manufactured by Teijin Kasei Co.) as the polyethylene terephthalate resin of the inner layer, intermediate layer and outer layer, and was measured.

Comparative Example 5

A multi-layer bottle was stretch blow-molded in the same manner as in Example 7 but using a polyethylene terephthalate resin (intrinsic viscosity: 0.75 dL/g) (RT543CTHP manufactured by Nihon Unipet Co.) as the polyethylene terephthalate resin of the inner layer, intermediate layer and outer layer, and was measured.

The measured results of intrinsic viscosities and hazes of the above Examples and Comparative Examples were as shown in Table 2.

TABLE 2

| | Intrinsic viscosity (dL/g) | | | Haze of 3 mm-thick injection-molded plate (%) |
| --- | --- | --- | --- | --- |
| | Before heat-treated | After heat-treated | Difference before and after heat treatment | |
| Ex. 7 | 0.718 | 1.032 | 0.314 | 3.7 |
| Ex. 8 | 0.732 | 0.987 | 0.255 | 4.8 |
| Comp. Ex. 4 | 0.683 | 0.912 | 0.229 | 78.3 |
| Comp. Ex. 5 | 0.645 | 0.832 | 0.187 | 92.3 |

The invention claimed is:

1. A biaxially stretch blow-molded container having a layer of a trimethylene naphthalate type polyester resin, wherein the layer of said trimethylene naphthalate type polyester resin in at least the container body portion satisfies either one or both of:
   (i) a Tc1 calorific value is not larger than 10 J/g in the DSC measurement; and
   (ii) tan δ maximum temperature≧90° C. and tan δ maximum value≦0.4
   in the dynamic viscoelasticity measurement.

2. The biaxially stretch blow-molded container according to claim 1, wherein said trimethylene naphthalate type polyester resin is homopolytrimethylene naphthalate.

3. The biaxially stretch blow-molded container according to claim 1, having a multi-layer structure comprising an intermediate layer of said trimethylene naphthalate type polyester resin, and an inner layer and an outer layer of an ethylene terephthalate type polyester resin.

4. The biaxially stretch blow-molded container according to claim 3, wherein said ethylene terephthalate type polyester resin has a difference in the intrinsic viscosity of not smaller than 0.25 dL/g upon heat-treating said ethylene terephthalate type polyester resin layer.

5. The biaxially stretch blow-molded container according to claim 3, wherein said trimethylene naphthalate type polyester resin layer has a thickness ratio of 0.1 to 15% relative to the thickness of the whole layers of the container body portion.

6. The biaxially stretch blow-molded container according to claim 1, wherein the shape of the bottom portion is a pressure-resistant shape.

* * * * *